United States Patent
Liu et al.

(10) Patent No.: US 10,860,224 B2
(45) Date of Patent: Dec. 8, 2020

(54) METHOD AND SYSTEM FOR DELIVERING MESSAGE IN STORAGE SYSTEM

(71) Applicant: EMC IP Holding Company LLC, Hopkinton, MA (US)

(72) Inventors: Yousheng Liu, Beijing (CN); Jamin Jianbin Kang, Beijing (CN); Xinlei Xu, Beijing (CN); Ruiyong Jia, Beijing (CN); Jian Gao, Beijing (CN); Lifeng Yang, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/779,430

(22) Filed: Jan. 31, 2020

(65) Prior Publication Data
US 2020/0174683 A1    Jun. 4, 2020

Related U.S. Application Data

(63) Continuation of application No. 15/630,891, filed on Jun. 22, 2017, now Pat. No. 10,552,067.

(30) Foreign Application Priority Data

Jun. 22, 2016    (CN) .......................... 2016 1 0461042

(51) Int. Cl.
*G06F 3/06*    (2006.01)
(52) U.S. Cl.
CPC .......... *G06F 3/0628* (2013.01); *G06F 3/0614* (2013.01); *G06F 3/0659* (2013.01)

(58) Field of Classification Search
CPC ..... G06F 3/0628; G06F 3/0614; G06F 3/0659
See application file for complete search history.

(56) References Cited

U.S. PATENT DOCUMENTS 7,305,520 B2 * 12/2007 Voigt .................... G06F 3/0613
                                                709/226
10,552,067 B2    2/2020 Liu et al.
(Continued)

OTHER PUBLICATIONS

Non-Final Office Action issued in related U.S. Appl. No. 15/630,891 dated Jul. 12, 2018.
(Continued)

*Primary Examiner* — Getente A Yimer
(74) *Attorney, Agent, or Firm* — Brian J. Colandreo; Mark H. Whittenberger; Holland & Knight LLP

(57) ABSTRACT

A method and a system for delivering a message in a storage system. In one embodiment of the present invention, there is provided a method for delivering a message in a storage system comprising a first controller, a second controller, a first communication area and a second communication area. The method comprises: in response to receiving a message that is to be delivered from the first controller to the second controller, writing the message to the first communication area that is readable and writable to the first controller and readable to the second controller; and writing an address identifier to the second communication area, the address identifier being used for indicating an address at which the second controller reads the message from the first communication area, the second communication area being readable to the first controller and readable and writable to the second controller.

19 Claims, 10 Drawing Sheets

(56) References Cited

U.S. PATENT DOCUMENTS

| | | | |
|---|---|---|---|
| 2005/0259620 A1* | 11/2005 | Igarashi | H04L 61/106 |
| | | | 370/331 |
| 2006/0193159 A1* | 8/2006 | Tan | G06F 16/9014 |
| | | | 365/49.16 |
| 2007/0174601 A1* | 7/2007 | Douglas | G06F 8/65 |
| | | | 713/1 |
| 2014/0136581 A1* | 5/2014 | Yamaguchi | G06F 11/2069 |
| | | | 707/827 |
| 2015/0039933 A1* | 2/2015 | Chen | G06F 3/0634 |
| | | | 714/6.3 |
| 2015/0178013 A1* | 6/2015 | Rostoker | G06F 3/0679 |
| | | | 711/115 |
| 2015/0264022 A1 | 9/2015 | Manvi et al. | |
| 2016/0285648 A1* | 9/2016 | Fan | H04L 61/6022 |
| 2017/0371576 A1 | 12/2017 | Liu et al. | |

OTHER PUBLICATIONS

Non-Final Office Action issued in related U.S. Appl. No. 15/630,891 dated Apr. 18, 2019.

Notice of Allowance issued in related U.S. Appl. No. 15/630,891 dated Sep. 27, 2019.

\* cited by examiner

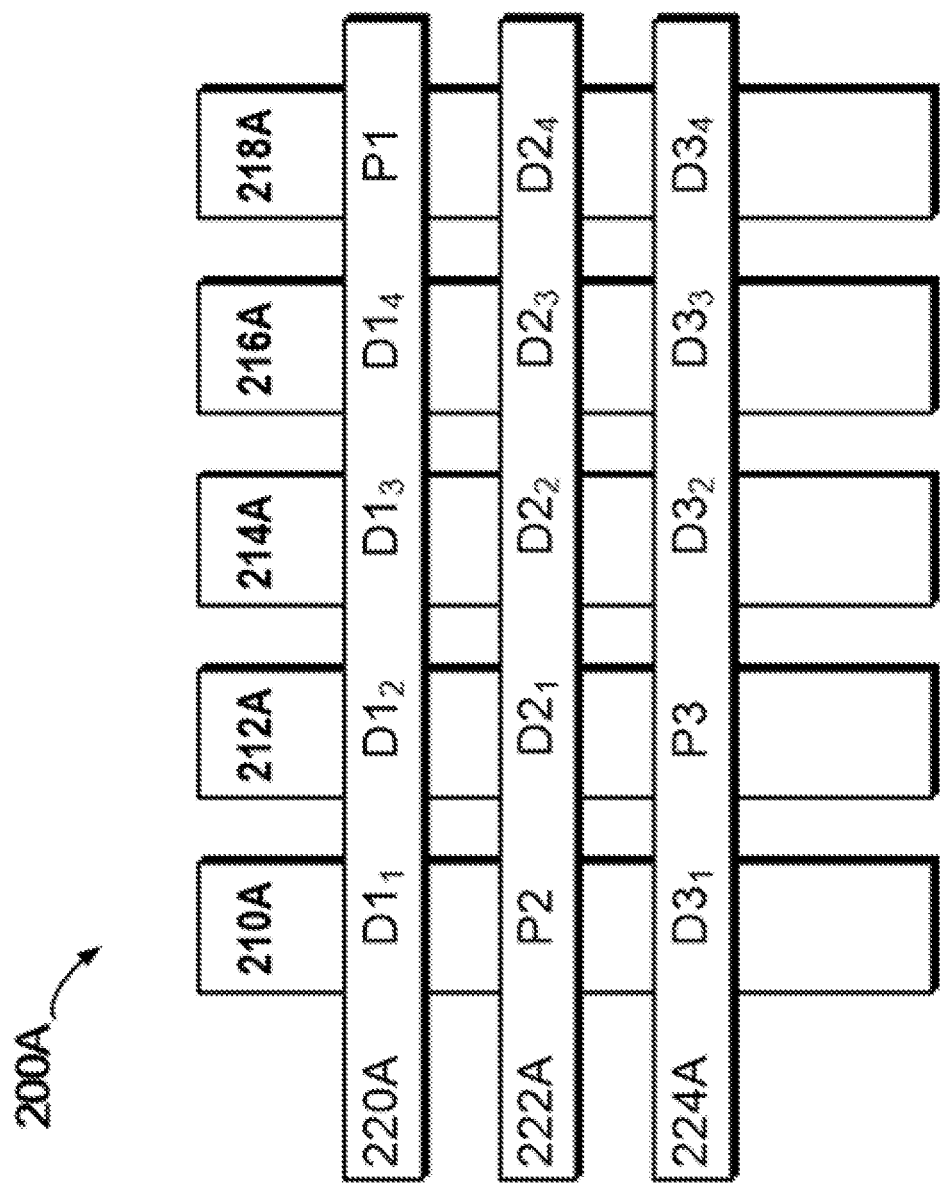

METHOD AND SYSTEM FOR DELIVERING MESSAGE IN STORAGE SYSTEM

RELATED APPLICATION

The subject application is a continuation of U.S. application Ser. No. 15/630,891; filed on Jun. 22, 2017, which claims priority from Chinese Patent Application Number CN201610461042.4, filed on Jun. 22, 2016 at the State Intellectual Property Office, China, titled "METHOD AND SYSTEM FOR TRANSMITTING MESSAGE IN STORAGE SYSTEM" the contents of which are herein incorporated by reference in its entirety.

BACKGROUND

Various embodiments of the present invention relate to storage management, and more specifically, to a method and a system for delivering a message in a storage system (e.g. Redundant Array of Independent Disks, RAID).

With the development of data storage techniques, various data storage devices now provide users with higher data storage capacity, and also the speed of accessing data has been increased greatly. Besides the increase of data storage capacity, users also impose greater demands on data reliability and response time of storage systems. So far various RAID-based data storage systems have been developed to increase data reliability. When one or more disks in a storage system fail, data in the failed disk(s) can be recovered from data in other disks operating normally.

The storage system may be accessed via storage control nodes. In a typical active-active type of storage system, two storage control nodes work jointly to process data access operations on the storage system and further provide higher usability and better performance. Each storage control node has its own memory (e.g. cache), and memories in two storage controllers operate in image style. The two storage control nodes may receive in parallel data access instructions from the outside, so such a problem might arise that the two storage control nodes concurrently perform operations to the same storage area. At this point, it becomes a focus of research regarding how to provide a secure and reliable locking mechanism to avoid conflicts between operations of the two storage control nodes.

SUMMARY

Therefore, it is desired to develop and implement a technical solution used for delivering a message in a storage system and further improving security and stability of the storage system. It is desired that the technical solution can be compatible with existing storage systems and manage data access in the storage system in a more secure and reliable way without any extra hardware devices added to storage systems.

In one embodiment of the present invention, there is provided a method for delivering a message in a storage system including a first controller, a second controller, a first communication area and a second communication area. The method includes: in response to receiving a message that is to be delivered from the first controller to the second controller, writing the message to the first communication area that is readable and writable to the first controller and readable to the second controller; and writing an address identifier to the second communication area, the address identifier being used for indicating an address at which the second controller reads the message from the first communication area, the second communication area being readable to the first controller and readable and writable to the second controller.

In one embodiment of the present invention, there is provided a system for delivering a message in a storage system. The system includes: one or more processors; a memory coupled to at least one processor of the one or more processors; computer program instructions stored in the memory which, when executed by the at least one processor, cause the system to execute a method for delivering a message in a storage system. The method includes: in the storage system including a first controller, a second controller, a first communication area and a second communication area, in response to receiving a message to that is be delivered from the first controller to the second controller, writing the message to the first communication area that is readable and writable to the first controller and readable to the second controller; and writing an address identifier to the second communication area, the address identifier being used for indicating an address at which the second controller reads the message from the first communication area, the second communication area being readable to the first controller and readable and writable to the second controller.

With the technical solution of the present invention, messages can be delivered in a storage system in a more secure and reliable way, and further access efficiency of the storage system may be increased.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
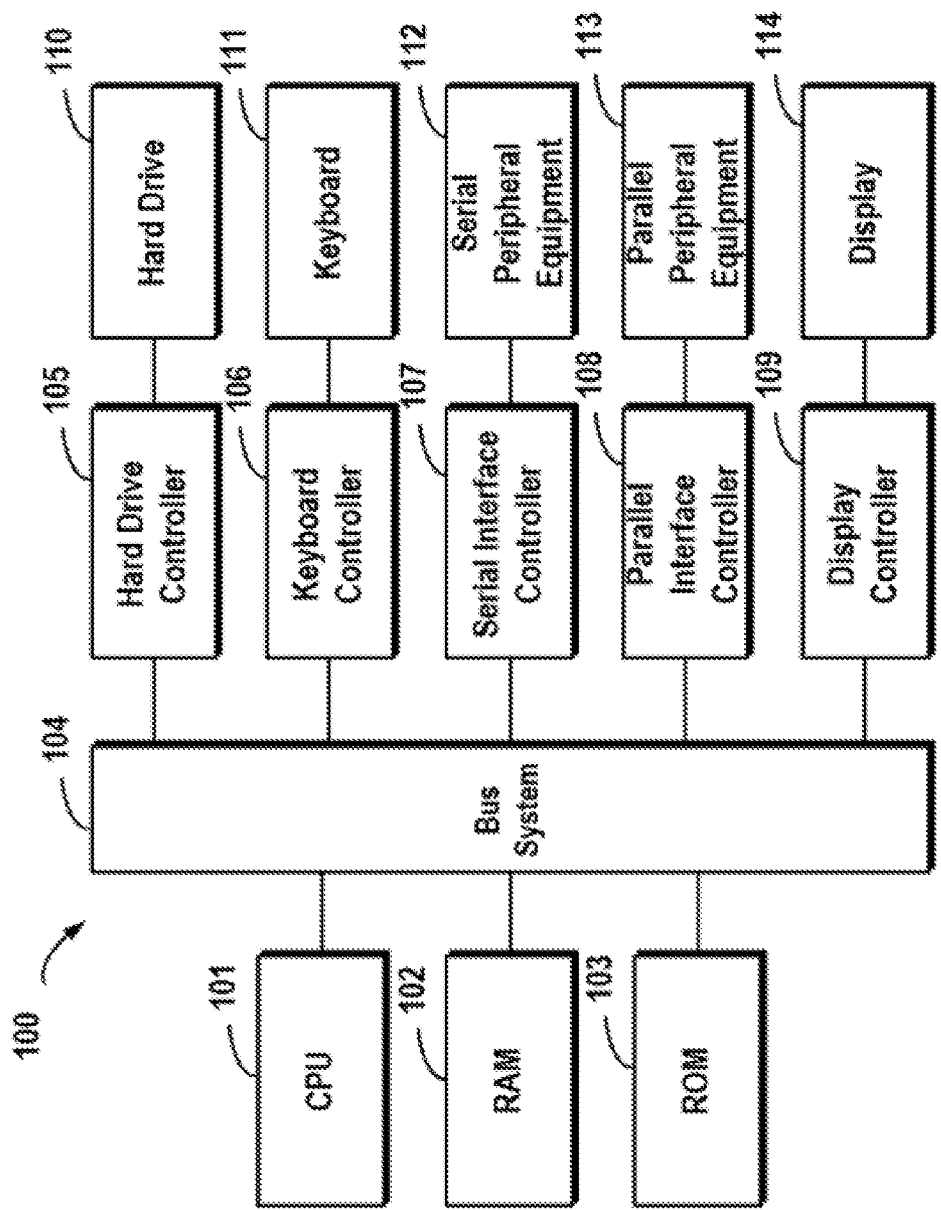
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) may combine multiple storage devices in to an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc. The operating system may consider a disk array, consisting of multiple storage devices, as a single logical storage unit or disk. By partitioning the disk array into multiple stripes, data may be distributed across multiple storage devices, so that low delay and high bandwidth is achieved, and data can be recovered to some extent when some disks are broken.

FIG. 2A schematically illustrates a schematic view 220A of a structure of RAID according to one technical solution. In this figure, working principles of RAID are illustrated by taking RAID-5 that consists of five independent storage devices (210A, 212A, 214A, 216A and 218A) as an example. It should be noted although in FIG. 2A there are schematically shown five storage devices. In other embodiments more or less storage devices may be included according to different versions of RAID. Moreover, although in FIG. 2A there are shown stripes 220A, 222A and 224A, in other examples the RAID system may further include different numbers of stripes.

In RAID, a stripe crosses multiple physical storage devices (for example, the stripe 220A crosses storage devices 210A, 212A, 214A, 216A and 218A). The stripe may be considered as a storage area among multiple storage devices which satisfies a given address range. Data stored in the stripe 220 includes multiple parts: a data block $D1_1$ stored in the storage device 210A, a data block $D1_2$ stored in the storage device 212A, a data block $D1_3$ stored in the storage device 214A, a data block $D1_4$ stored in the storage device 216A, and a data block P1 stored in the storage device 218A. In this example, data blocks $D1_1$, $D1_2$, $D1_3$ and $D1_4$ are stored data, and data block P1 is a parity of the stored data.

The mode of storing data in other stripes is similar to that in the stripe 220A, and the difference is that the parity about other data block may be stored in other storage device than the storage device 218A. In this way, when one of the multiple storage devices 210A, 212A, 214A, 216A and 218A fails, data in the failed device may be recovered from other normal storage devices.

Figure 2B:
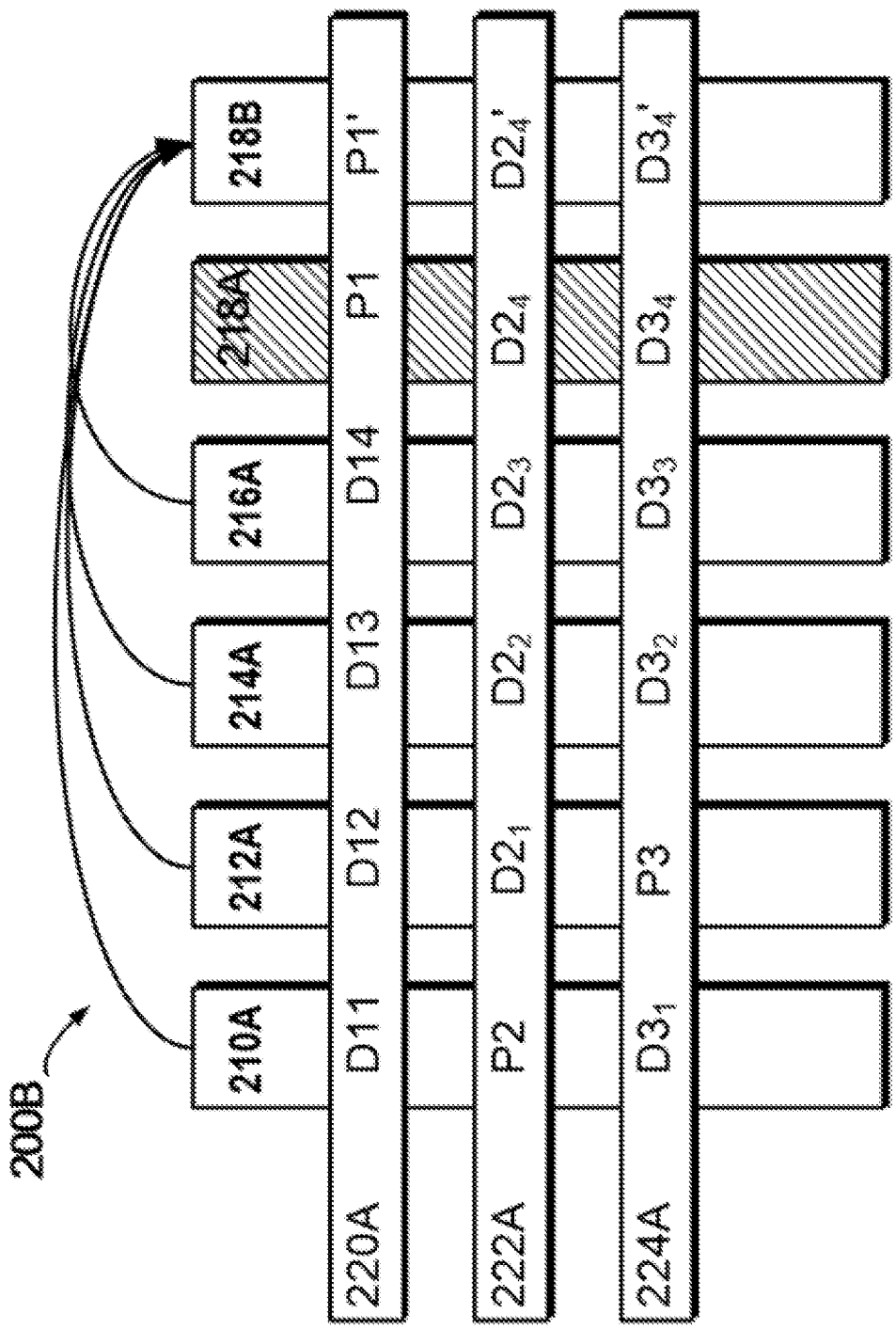
FIG. 2A schematically illustrates a schematic view of a structure of a Redundant Array of Independent Disks according to one technical solution, and FIG. 2B schematically illustrates a schematic view of rebuilding process of a Redundant Array of Independent Disks according to one technical solution.

FIG. 2B schematically illustrates a schematic view 220B of rebuilding process of RAID. As shown in FIG. 2B, when one storage device (e.g. the storage device 218A shown in shadow) fails, data may be recovered from other storage devices 210A, 212A, 214A and 216A operating normally. At this point, a new backup storage device 218B may be added to RAID to replace the storage device 218A. In this way, recovered data may be written to the storage device 218B, and system rebuilding may be realized.

Figure 3:
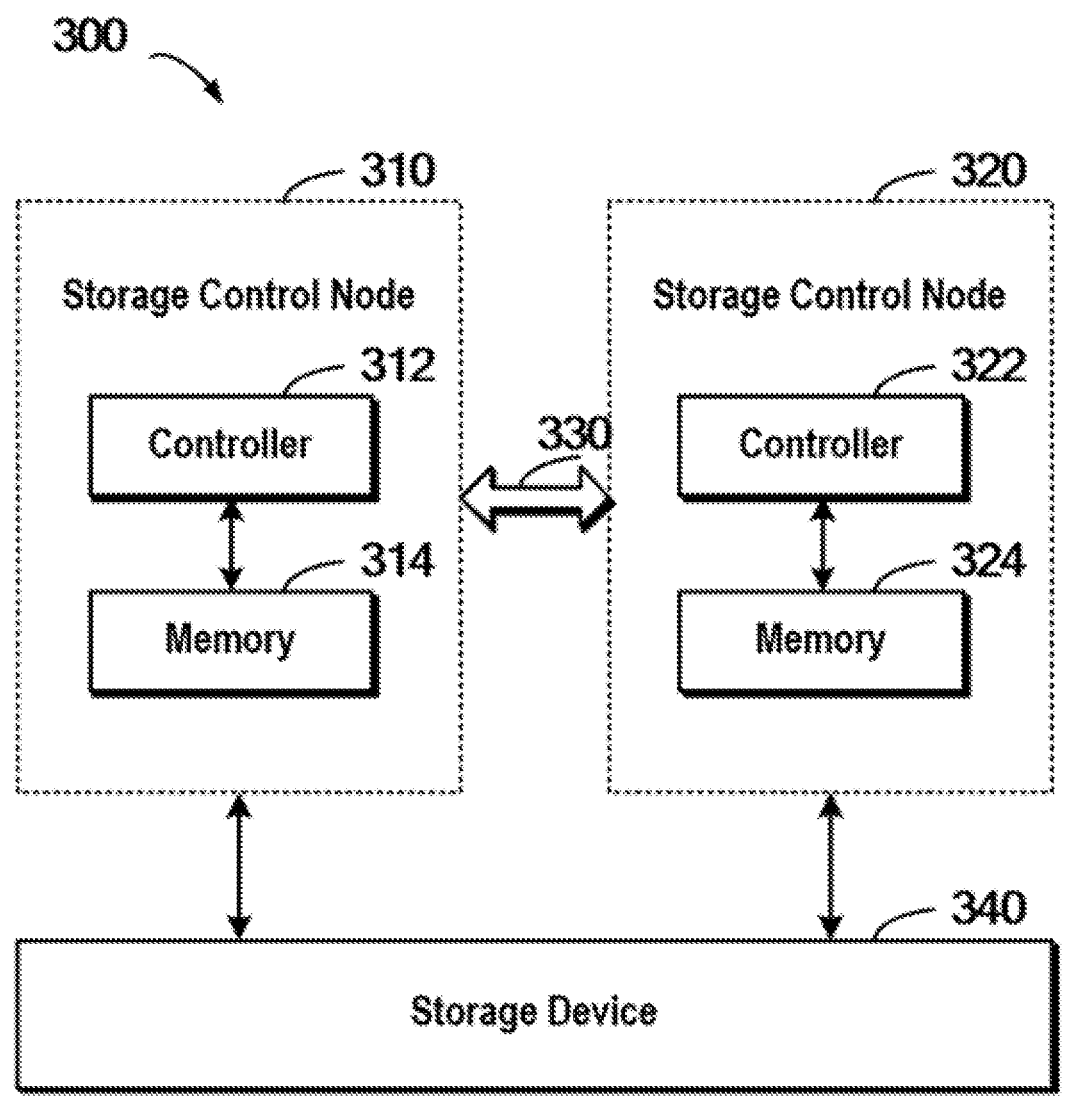
FIG. 3 schematically illustrates a schematic view of a method for managing a memory in a storage system according to one technical solution.

FIG. 3 schematically illustrates a schematic view of a method for managing a memory in a storage system according to one technical solution. As shown in FIG. 3, a storage system 300 may provide data access service to the outside via one or more storage control nodes. In this example, the storage system 300 may include storage control nodes 310 and 320. During operation of the storage system 300, two storage control nodes 310 and 320 may provide service to the outside in parallel. If one node fails, then the other node may continue working.

The storage control node 310 may include a controller 312 and a memory 314 (e.g. a cache). When the storage control node 310 receives an access request (e.g. read-write request) from an external host, the controller 312 processes the request. Similarly, another storage control node 320 includes a controller 322 and a corresponding memory 324, and operates in a similar manner of storage control node 310. The two storage control nodes 310, 320 may operate in parallel for processing different access requests.

In order to ensure data consistency in the storage system during operation, an internal communication channel 330 is arranged in the storage system, for transferring a message between two storage control nodes 310 and 320. However, once the internal communication channel 330 fails, the communication between the two storage control nodes 310 and 320 becomes unavailable. If the two storage control nodes continue separately processing requests from an external host, then a "split-brain" phenomenon will be caused in storage system 300, and further data conflicts arise in storage system 300.

So far there have been proposed a variety of technical solutions in order to enhance reliability of communication between storage control nodes. In one technical solution, a more independent reliable communication channel is additionally built to support the communication between two storage control nodes. However, this technical solution will lead to extra communication overheads, which does not help to increase data response efficiency of the storage system. In another technical solution, a third entity is arranged to detect and process "split-brain" problems; when discovering a "split-brain" phenomenon, the third entity manages the two storage control nodes through arbitration. Nevertheless, this method will also cause extra hardware and software overheads. Therefore, how to enable the two storage control nodes to communicate in a robust and secure-reliable manner becomes a focus of research.

In view of above disadvantages in the prior art, one embodiment of the present invention provides a method for delivering a message in a storage system. The storage system includes a first controller, a second controller, a first communication area as well as a second communication area. The method includes: in response to receiving a message that is to be delivered from the first controller to the second controller, writing the message to the first communication area, the first communication area being readable and writable to the first controller and being readable to the second controller; and writing an address identifier to the second communication area, the address identifier being used for indicating an address at which the second controller reads the message from the first communication area, the second communication area being readable to the first controller and being readable and writable to the second controller.

Figure 4:
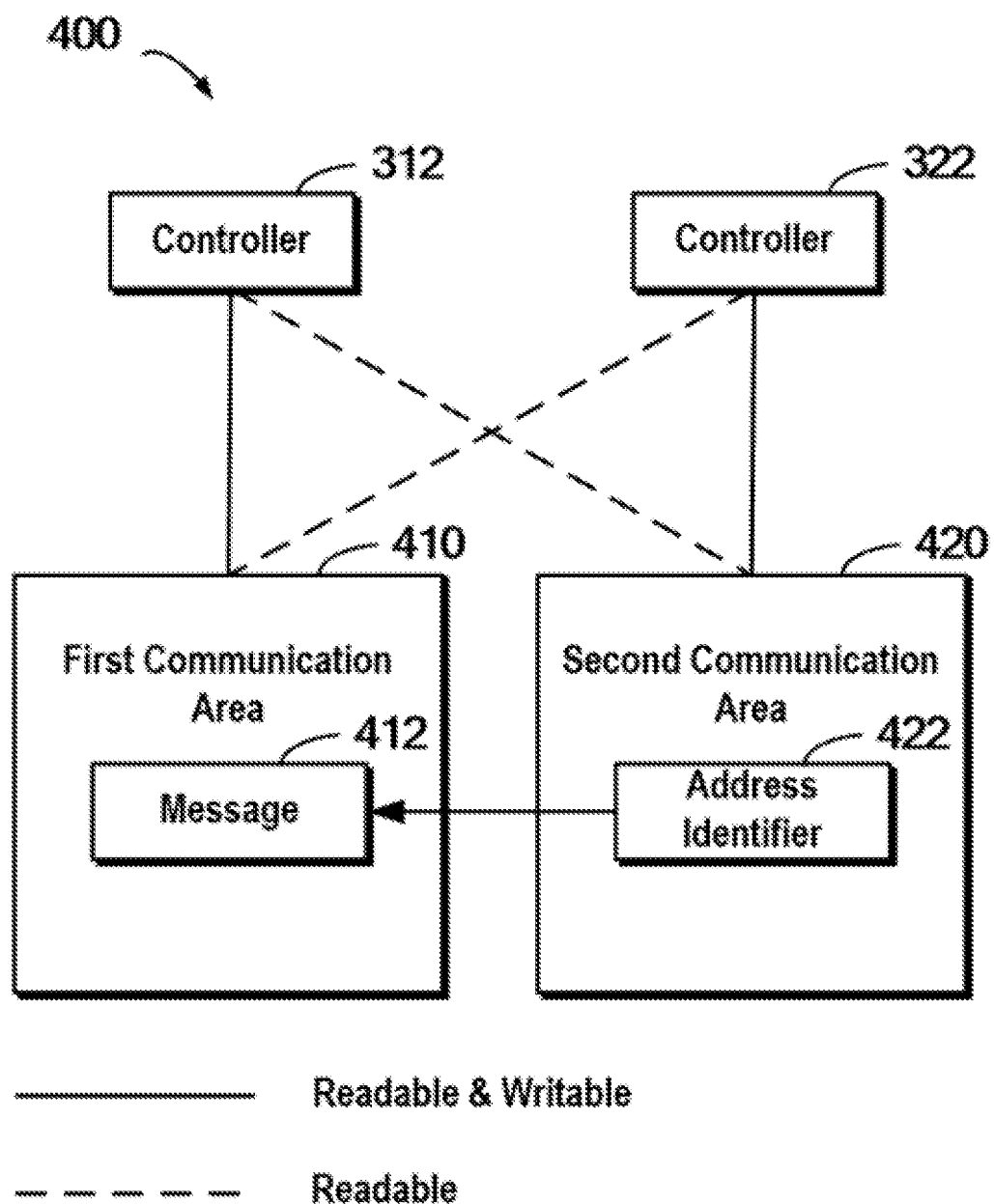
FIG. 4 schematically illustrates an architecture view of a technical solution for delivering a message in a storage system according to one embodiment of the present invention.

FIG. 4 schematically illustrates an architecture view of a technical solution for delivering a message in a storage system 400 according to one embodiment of the present invention. As shown in FIG. 4, the storage system includes two controllers, namely the controller 312 and controller 322. Moreover, two communication areas are arranged in the storage system, namely a first communication area 410 and a second communication area 420. The two communication areas are accessible to the controllers 312 and 322, with difference in access permission. Readable and writable access permission is shown in solid lines; for example, the first communication area 410 is readable and writable to the controller 312, and the second communication area 420 is readable and writable to the controller 322. Readable access permission is shown in dashed lines; for example, the second communication area 420 is readable to the controller 312, and the first communication area 410 is readable to the controller 322.

As shown in FIG. 4, by arranging in the storage system the first and second communication areas to which the two controllers have different access permission, messages are delivered via the two communication areas, and further the need to build an extra communication channel between the two controllers is avoided. The controller 312 may write to the first communication area 410 a message 412 that is desired to be transferred to the controller 322, and write to the second communication area 420 an address identifier 422 that points to an address of the message 412 in first communication area 410. In this way, the controller 322 may obtain the address identifier 422, and then obtain the message 412 from the first communication area 410 via the address identifier 422.

Figure 5:
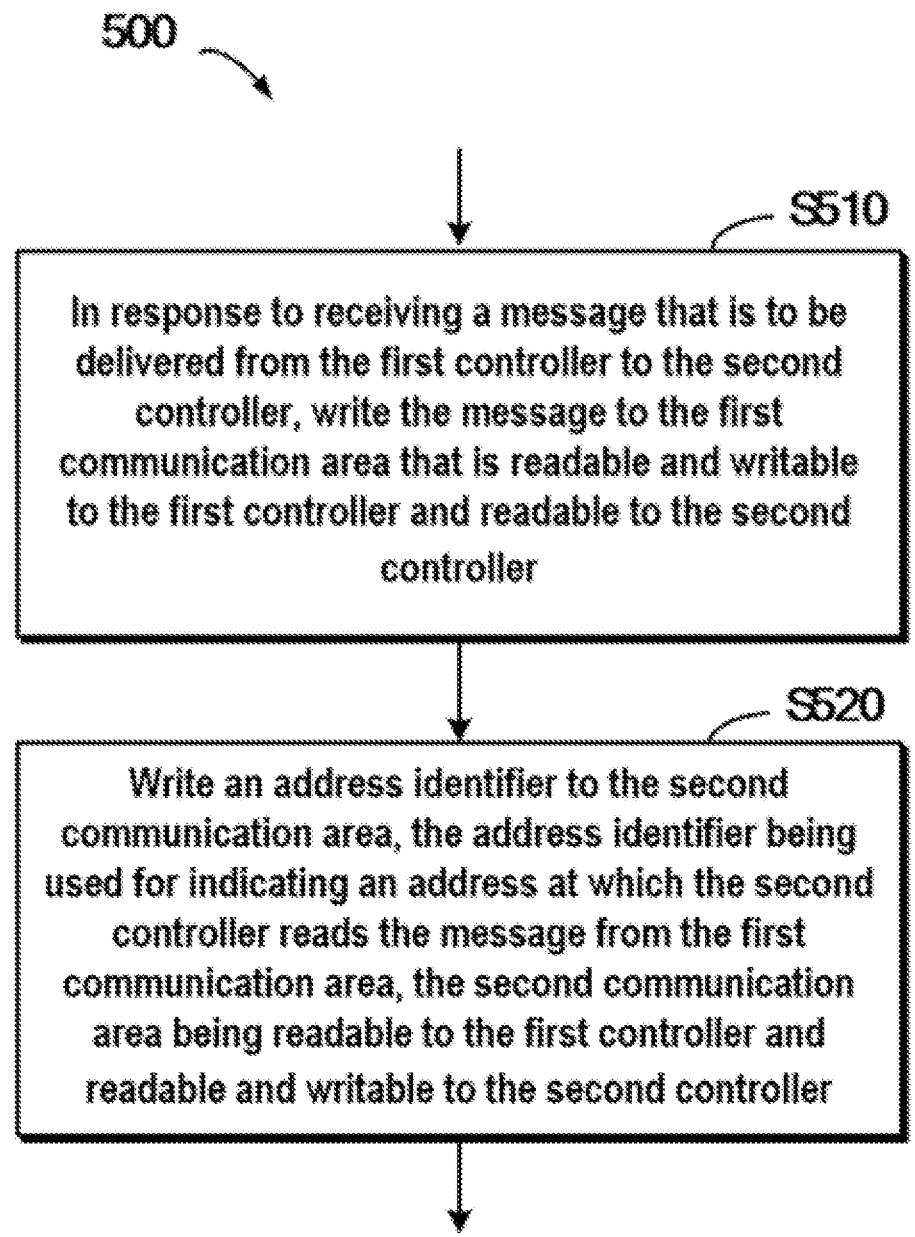
FIG. 5 schematically illustrates a flowchart of a method for delivering a message in a storage system according to one embodiment of the present invention.

With reference to FIG. 5, detailed description is presented below to the concrete process of a method according to one embodiment of the present invention. FIG. 5 schematically shows a flowchart 500 of a method for delivering a message in a storage system according to one embodiment of the present invention. In step S510, in a storage system including a first controller, a second controller, a first communication area and a second communication area, in response to receiving a message that is to be delivered from the first controller to the second controller, the message is written to the first communication area, where the first communication area is readable and writable to the first controller and readable to the second controller. In step S520, an address identifier is written to the second communication area, where the address identifier is used for indicating an address at which the second controller reads the message from the first communication area, the second communication area is readable to the first controller and being readable and writable to the second controller.

In this example, by writing a message to the first communication and writing the message's address identifier to the second communication area, the second controller is enabled to read a message from the first communication area via the address identifier. In this way, it is not necessary to build a dedicated communication channel between the first controller and the second controller, but messages may be transferred based on existing communication channels in the storage system.

In one embodiment of the present invention, the above described first communication area and second communication area may be deployed in a storage device (e.g., a storage disk or array of storage disks) included in the storage system and for storing data. Take a single storage disk as one example of the storage device. Dedicated storage areas may be allocated in the storage disk as the first communication area and the second communication area. In a storage system having two access ports (e.g., first controller and second controller), since both controllers are connected to the storage disk in the storage system, message transmission may be implemented by means of existing data channels between the controllers and the storage disk. In this way, no dedicated communication channel needs to be built between the two controllers, so "split-brain" problems caused by failure of a dedicated communication channel are also avoided.

In one embodiment of the present invention, in response to the address identifier having been written to the second communication area, an interrupt message may be sent to the second controller so as to notify the second controller that a message in the first communication area is ready to be read. In one embodiment of the present invention, those skilled in the art may trigger the second controller to read messages in other manner based on needs of a concrete application environment.

In one embodiment of the present invention, the writing the message to the first communication area includes: determining state of the first communication area according to metadata in the first communication area; and in response to the state indicating the first communication area is not full, writing the message to the first communication area.

Those skilled in the art may customize a position, size and internal organization mode of the first communication area. For example, addresses, in the first communication area, for storing messages may be described by metadata. Since the size of the first communication area may be fixed, before writing the message it may be judged whether in the first communication area there still exists an available storage space for writing a new message. When the first communication area is not full, the message may be written thereto; where the first communication area is full, the flow proceeds may wait.

Those skilled in the art may use any technique that is known in the prior art or to be developed later, to determine whether the first communication area is full or not. For example, suppose in the first communication area there is one space for storing only one message, then at this point the metadata may be a pointer pointing to the storage space. A flag may be set in the metadata to indicate whether the storage space has messages stored therein, and further based on the flag, it may be determined whether the first communication area is already full or not. For another example, suppose in the first communication area there are spaces for storing multiple messages, then the multiple spaces may be organized in a queue, the queue's head pointer is represented by the metadata, and whether the first communication area is full or not is determined based on various queue operations about the queue.

In one embodiment of the present invention, the writing the first message to the first communication area further includes: based on the metadata in the first communication area, determining an available address for writing the message to the first communication area; and writing the message to the available address. In this embodiment, since the metadata may describe an available address in the first communication area, first an available address may be determined based on the metadata, and subsequently the message may be written to the available address.

In one embodiment of the present invention, the first communication area includes a message queue, and the metadata in the first communication area includes a head pointer of the message queue. The method further includes: in response to the message being written to the available address, updating the head pointer to indicate another available address for writing the message to the first communication area.

In this embodiment there is shown a situation where the first communication area includes a message queue for storing multiple messages. For example, the head pointer here may point to a currently available storage address. A message, if needing to be transmitted, may be directly written to a position to which the pointer points; after the message is written, the head pointer may point to the next available address. For another example, the head pointer may further point to a last written message in the message queue, at which point an available address is first determined based on the head pointer, then a message is written to the available address, and subsequently the head pointer points to the currently written message.

Figure 6:
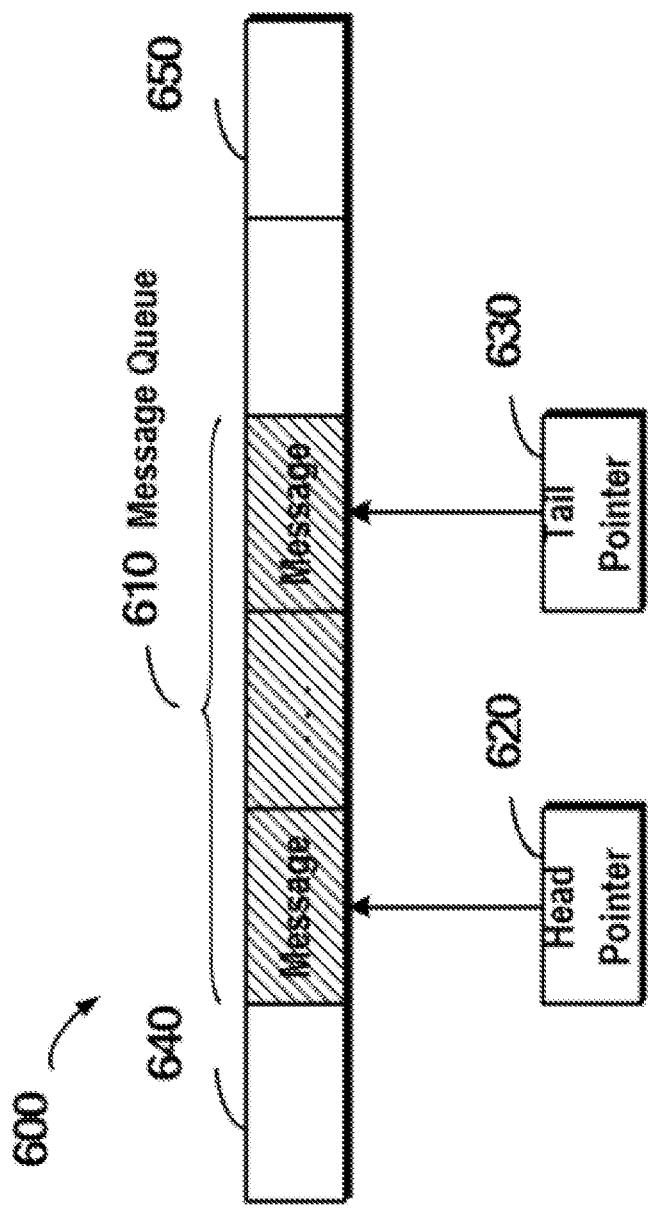
FIG. 6 schematically illustrates a schematic view of a data structure of a first communication area according to one embodiment of the present invention.

In one embodiment of the present invention, the address identifier includes a tail pointer of the message queue, and the method further includes: in response to the second controller reading the message from the tail pointer, the second controller updates the tail pointer to point to another message. When messages are stored in a message queue, the message queue may be defined with a head pointer and a tail pointer. Specifically, FIG. 6 shows a schematic view of a data structure of a first communication area 600 according to one embodiment of the present invention.

The first communication area 600 may include storage spaces for storing multiple messages, wherein a position of a message queue 610 is shown in shadow area, and other available storage spaces in first communication area 600 are shown in blanks. In this example, a head pointer 620 indicates the first message in the message queue which has not been read by the second controller, and a tail pointer 630 points to the last message that has not been read by the second controller. When it is desired to transmit a new message from the first controller to the second controller, first a position of a current message header may be determined on the basis of the head pointer 620, and a storage space 640 adjacent to the message header may be selected for storing a new message, and subsequently the head pointer 620 moves forward by one position and points to the storage space 640. The second controller reads a message from a position of the tail pointer 630, for example, after reading a message to which the tail pointer 630 points, the tail pointer 630 moves forward by one position.

In one embodiment of the present invention, various storage spaces in first communication area may be organized in a ring. For example, through a series of operations, the head pointer 620 may point to the storage space 640; where the first communication area 600 is organized in a ring, a storage space 650 may be the next storage space associated with the head pointer 620. In addition, when the first communication area 600 is organized in a ring, whether first communication area 600 is full or not may be judged by a positional relationship between the head pointer 620 and the tail pointer 630.

In one embodiment of the present invention, the storage system includes a plurality of storage devices, the first communication area crosses respective storage areas in the plurality of storage devices, and the respective storage areas in the plurality of storage devices are connected in a ring to form the first communication area. For example, the storage system may include a plurality of storage devices, and the plurality of storage devices may be common disk devices and provide a larger storage space as an array. Specifically, the first communication area may cross the plurality of storage devices to provide a larger communication area for holding more messages.

For example, suppose the communication area in each storage device may hold 4 messages. When the storage system includes five storage devices, communication areas in the five storage devices may be connected head to tail to form the first communication area. At this point, the size of the first communication area will become five times as large as the original, i.e., the first communication may hold 20 messages. Note the amount of messages held by the communication area in each storage device is merely illustrative, and in other embodiments those skilled in the art may adjust the amount according to needs of a specific application environment. Further, those skilled in the art may further adjust the size of a space allocated for each message, according to needs of a specific application environment. Details are ignored here.

In one embodiment of the present invention, the storage system is a Redundant Array of Independent Disks, and the method further includes: in response to one storage device among the plurality of storage devices failing, recovering data in the message queue from other storage devices among the plurality of storage devices.

Figure 7:
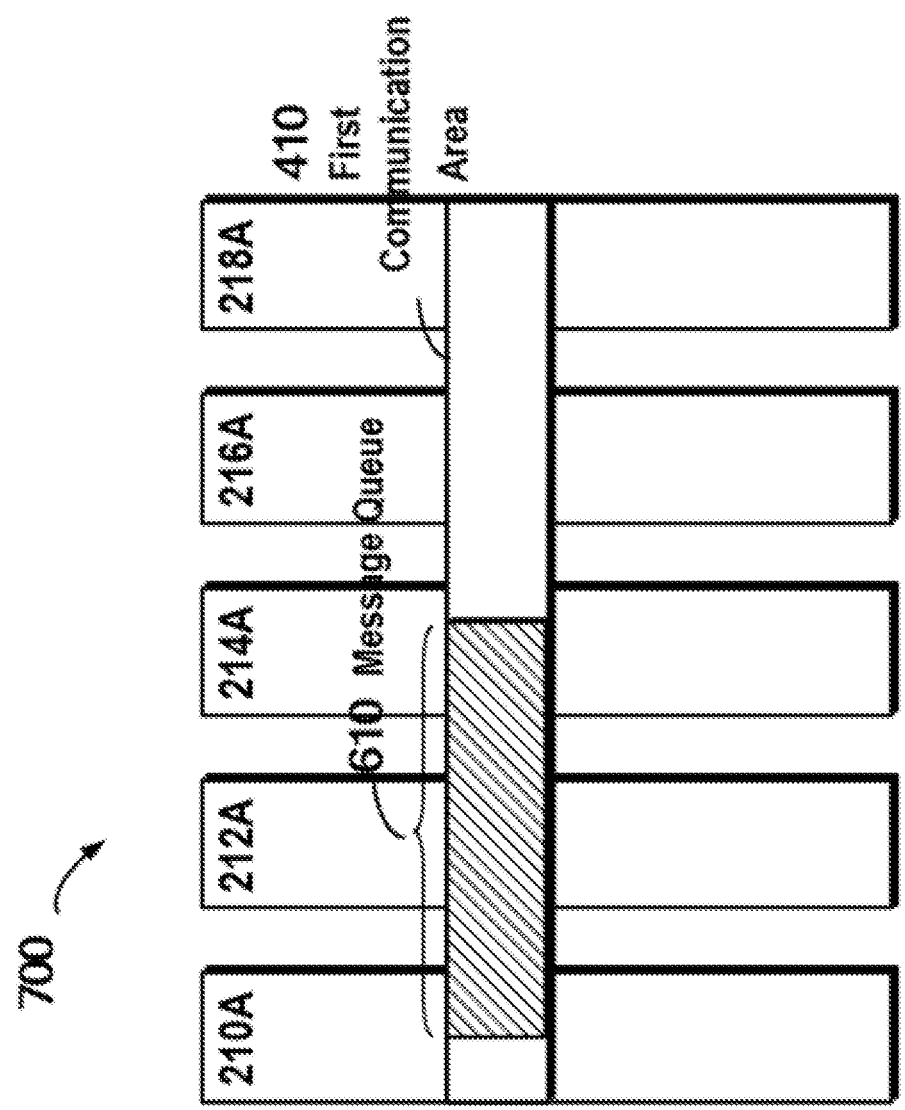
FIG. 7 schematically illustrates a schematic view of a structure of a first communication area deployed across multiple storage devices in RAID according to one embodiment of the present invention.

Specifically, FIG. 7 shows a schematic view 700 of the structure of a first communication area deployed across a plurality of storage devices in RAID according to one embodiment of the present invention. As shown in FIG. 7, the first communication area 410 is deployed across RAID. For example, an area shown in shadow is message queue 610. Since the storage devices 210A, 212A, 214A, 216A and 218A include redundant storage devices, when one storage device in the storage system fails, data in the message queue in the first communication area 410 may be recovered from data in other storage devices. In this way, even if in the message queue 610 there exist messages that have not been read by the second controller, when one storage device, e.g. 212A fails, data in the message queue 610 may be recovered from the other four storage devices so as to be read by the second controller. In this embodiment, messages may be delivered between two controllers in a more secure and reliable manner.

Figure 8:
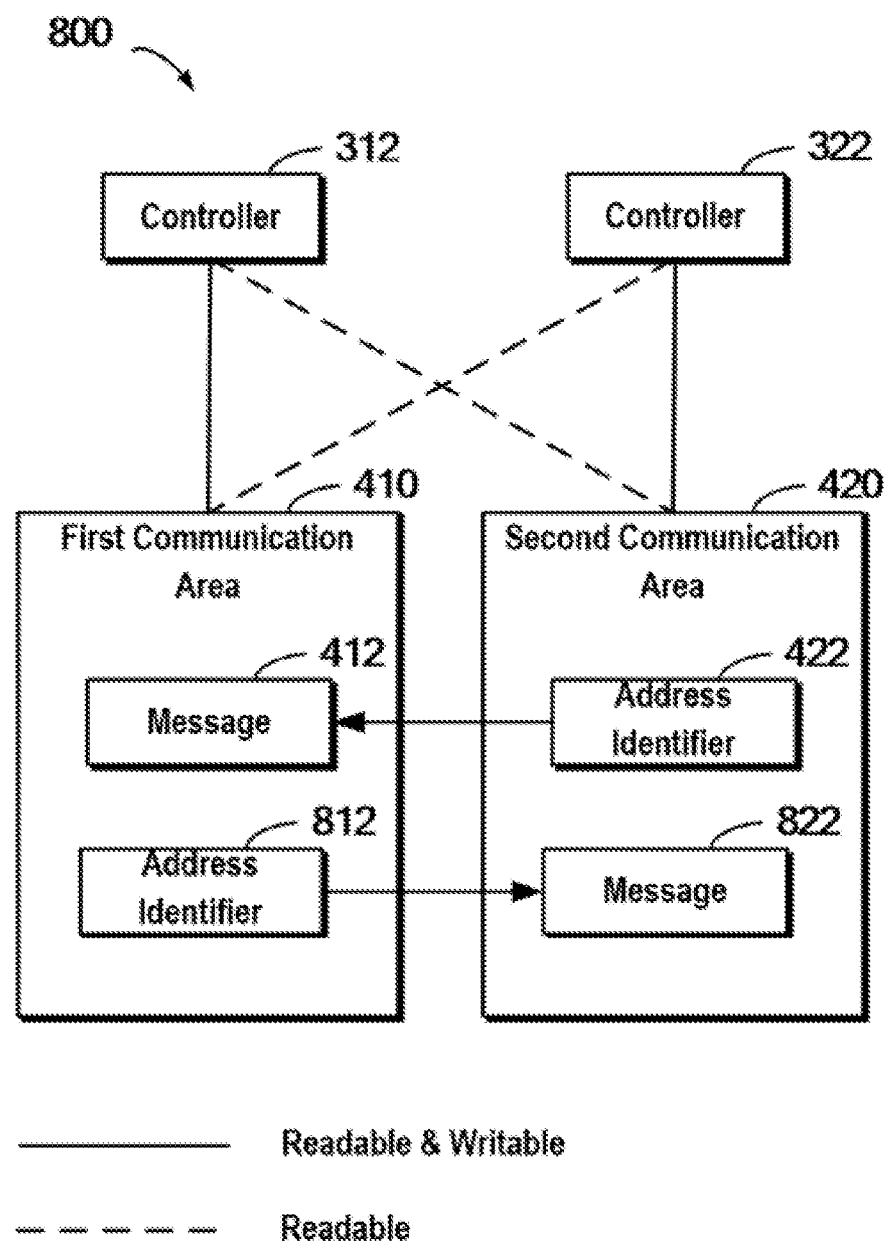
FIG. 8 schematically illustrates an architecture view of a technical solution for delivering a message in a storage system according to one embodiment of the present invention.

FIG. 8 schematically shows an architecture view 800 of a technical solution for delivering a message in a storage system according to one embodiment of the present invention. Like contents shown in FIG. 4, architecture view 800 shown in FIG. 8 differs in the following: the second communication area 420 further includes a message 822 and is used for storing messages sent from the second controller 322 to the first controller 312; and the first communication area 410 further includes an address identifier 812 for indicating an address of the message 822 in the second communication area 420. In this way, the first controller 312 and the second controller 322 can send a message to each other via first communication area 410 and second communication area 420.

In one embodiment of the present invention, in response to receiving another message that is to be delivered from the second controller to the first controller, the second controller writes the other message to the second communication area; and another address identifier is written to the first communication area, the other address identifier being for indicating that the first controller reads an address of the other address from the second communication area.

With reference to FIG. 8, when the controller 322 receivers a message to be transmitted to the controller 312, the message 822 is written to the second communication area 420. Subsequently, an address identifier of an address of the message 822 in second the communication area 420 is written to the first communication area 410. In this way, the controller 312 can read the content of the message 822 by means of the address identifier 812.

Note the first controller and the second controller as described in the present invention are two parallel controllers in the storage system, and they may be equal in status.

Therefore, various technical solutions that have been described by taking the first controller as example may further be executed on the second controller.

In one embodiment of the present invention, there is provided a method for receiving messages in a storage system including a first controller, a second controller, a first communication area and a second communication area. The method includes: reading an address identifier from the second communication area that is readable to the first controller and readable and writable to the second controller; and reading a message from a position in the first communication area as indicated by the first address identifier, the first communication area being readable and writable to the first controller and being readable to the second controller.

The foregoing embodiment records the procedure that the second controller reads a message from the first controller. Specifically, with reference to an example in FIG. 9, the controller 322 retrieves the address identifier from the second communication area 420, and subsequently reads the message 412 from the first communication area 410 based on the address identifier 422. In one embodiment of the present invention, when messages are stored in a message queue, the controller 322, after obtaining a message, may update the address indicated by the address identifier 422 to cause the address identifier 422 to point to another to-be-read message.

In one embodiment of the present invention, the first communication area includes a message queue, the storage system includes at least one storage device, and the first communication area crosses respective storage areas in the at least one storage device which are connected head to tail to form the first communication area. In this embodiment, the first communication area may be formed in a ring across a plurality of storage devices in the storage system.

Figure 9:
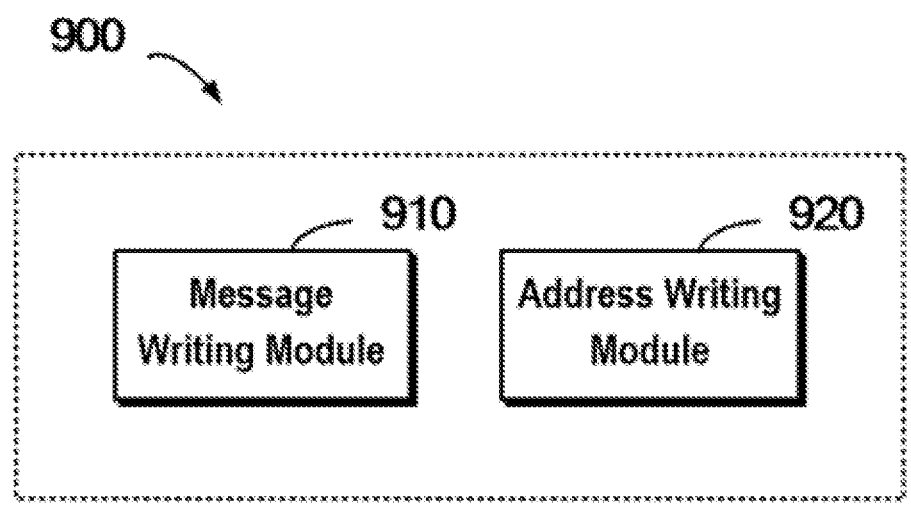
FIG. 9 schematically illustrates a block diagram of an apparatus for delivering a message in a storage system according to one embodiment of the present invention.

FIG. 9 schematically shows a block diagram 900 of an apparatus for delivering a message in a storage system according to one embodiment of the present invention. As shown in FIG. 9, there is proposed an apparatus for delivering a message in a storage system including a first controller, a second controller, a first communication area and a second communication area. The apparatus includes: a message writing module 910 configured to, in response to receiving a message that is to be delivered from the first controller to the second controller, write the message to the first communication area that is readable and writable to the first controller and readable to the second controller; and an address writing module 920 configured to write an address identifier to the second communication area, the address identifier being used for indicating an address at which the second controller reads the message from the first communication area, the second communication area being readable to the first controller and readable and writable to the second controller.

In one embodiment of the present invention, the message writing module 910 is further configured to: determine state of the first communication area according to metadata in the first communication area; and write the message to the first communication area in response to the state indicating the first communication area is not full.

In one embodiment of the present invention, the message writing module 910 is further configured to: determine an available address for writing the message to the first communication area, based on the metadata in the first communication area; and write the message to the available address.

In one embodiment of the present invention, the first communication area includes a message queue, and the metadata in the first communication area includes a head pointer of the message queue; the apparatus further includes: an updating module configured to, in response to the message being written to the available address, update the head pointer to indicate another available address for writing a message to the first communication area.

In one embodiment of the present invention, the address identifier includes a tail pointer of the message queue, and the updating module is further configured to: in response to the second controller reading the message from the tail pointer, update the tail pointer by the second controller so as to point to another message.

In one embodiment of the present invention, the storage system includes a plurality of storage device, and the first communication area crosses respective storage areas in the plurality of storage devices, the respective storage areas in the plurality of storage devices being connected in a ring to form the first communication area.

In one embodiment of the present invention, the storage system is a Redundant Array of Independent Disks, and the apparatus further includes: a recovering module configured to, in response to one storage device among the plurality of storage devices failing, recover data in the message queue from other storage devices among the plurality of storage devices.

In one embodiment of the present invention, message writing module 910 is further configured to: in response to receiving another message that is to be delivered from the second controller to the first controller, write the other message to the second communication area by the second controller; and address writing module 920 is further configured to write another address identifier to the first communication area, the other address identifier being used for indicating that the first controller reads an address of the other message from the second communication area.

In one embodiment of the present invention, there is provided an apparatus for receiving messages in a storage system including a first controller, a second controller, a first communication area and a second communication area. The apparatus includes: an address reading module configured to read an address identifier from the second communication area that is readable to the first controller and readable and writable to the second controller; and a message reading module configured to read a message from a position in the first communication area as indicated by the address identifier, the first communication area being readable and writable to the first controller and readable to the second controller.

In one embodiment of the present invention, the first communication area includes a message queue, the storage system includes at least one storage device, the first communication area crosses respective storage areas in the at least one storage device which are connected in a ring to form the first communication area.

In one embodiment of the present invention, there is proposed a system for delivering a message in a storage system. The system includes: one or more processors; a memory coupled to at least one processor of the one or more processors; computer program instructions stored in the memory which, when executed by the at least one processor, cause the system to execute a method for delivering a message in a storage system. The method includes: in the storage system including a first controller, a second controller, a first communication area and a second communication area, in response to receiving a message that is to be delivered from the first controller to the second controller, writing the message to the first communication area that is readable and writable to the first controller and readable to the second controller; and writing an address identifier to the second communication area, the address identifier being used for indicating an address at which the second controller reads the message from the first communication area, the second communication area being readable to the first controller and readable and writable to the second controller.

In one embodiment of the present invention, the writing the message to the first communication area includes: determining state of the first communication area according to metadata in the first communication area; and writing the message to the first communication area in response to the state indicating that the first communication area is not full.

In one embodiment of the present invention, the writing the message to the first communication area further includes: determining an available address for writing the message to the first communication area, based on the metadata in the first communication area; and writing the message to the available address.

In one embodiment of the present invention, the first communication area includes a message queue, the metadata in the first communication area including a head pointer of the message queue; and the method further includes: in response to the message being written to the available address, updating the head pointer to indicate another available address for writing a message to the first communication area.

In one embodiment of the present invention, the address identifier includes a tail pointer of the message queue, and the method further includes: in response to the second controller reading the message from the tail pointer, updating the tail pointer by the second controller so as to point to another message.

In one embodiment of the present invention, the storage system includes a plurality of storage device, and the first communication area crosses respective storage areas in the plurality of storage devices, the respective storage areas in the plurality of storage devices being connected in a ring to form the first communication area.

In one embodiment of the present invention, the storage system is a Redundant Array of Independent Disks, and the method further includes: in response to one storage device among the plurality of storage devices failing, recovering data in the message queue from other storage devices among the plurality of storage devices.

In one embodiment of the present invention, the method further includes: in response to receiving another message that is to be delivered from the second controller to the first controller, writing the other message to the second communication area by the second controller; and writing another address identifier to the first communication area, the other address identifier being used for indicating that the first controller reads an address of the other message from the second communication area.

In one embodiment of the present invention, there is proposed a system for receiving messages in a storage system. The system includes: one or more processors; a memory coupled to at least one processor of the one or more processors; computer program instructions stored in the memory which, when executed by the at least one processor, cause the system to execute a method for receiving messages in a storage system. The method includes: in the storage system including a first controller, a second controller, a first communication area and a second communication area, reading an address identifier from the second communication area that is readable to the first controller and readable and writable to the second controller; and reading a message from a position in the first communication area as indicated by the address identifier, the first communication area being readable and writable to the first controller and readable to the second controller.

In one embodiment of the present invention, the first communication area includes a message queue, the storage system includes at least one storage device, the first communication area crosses respective storage areas in the at least one storage device which are connected in a ring to form the first communication area.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for delivering a message in a storage system comprising a first controller, a second controller, a first communication area and a second communication area, the method comprising:
    in response to receiving a message that is to be delivered from the first controller to the second controller, writing the message to the first communication area that is readable and writable to the first controller and readable to the second controller, wherein writing the message to the first communication area comprises:
        determining a state of the first communication area according to metadata in the first communication area, wherein the metadata defines the address for storing the message in the first communication area such that when a position, a size, and an internal organization of the first communication area are customized, determining the state of the first communication area includes determining that there still exists an available storage space in the first communication area for writing a new message;
        writing the message to the first communication area in response to the state indicating that the first communication area is not full; and not writing the message the first communication area in response to the state indicating that the first communication area is full;

writing an address identifier to the second communication area, the address identifier being used for indicating an address at which the second controller reads the message from the first communication area, the second communication area being readable to the first controller and readable and writable to the second controller;

in response to receiving another message that is to be delivered from the second controller to the first controller, writing the other message to the second communication area by the second controller, the second communication area being readable to the first controller and readable and writable to the second controller; and writing another address identifier to the first communication area, the other address identifier being used for indicating an address at which the first controller reads the other message from the second communication area.

2. The method according to claim 1, wherein the writing the message to the first communication area further comprises:

determining an available address for writing the message to the first communication area based on the metadata in the first communication area; and writing the message to the available address.

3. The method according to claim 2, wherein the first communication area comprises a message queue, the metadata in the first communication area comprising a head pointer of the message queue; and the method further comprises:

in response to the message being written to the available address, updating the head pointer to indicate another available address for writing a message to the first communication area.

4. The method according to claim 3, wherein the address identifier comprises a tail pointer of the message queue, and the method further comprises:

in response to the second controller reading the message from the tail pointer, updating the tail pointer by the second controller so as to point to another message.

5. The method according to claim 3, wherein the storage system comprises a plurality of storage device, and the first communication area crosses respective storage areas in the plurality of storage devices, the respective storage areas in the plurality of storage devices being connected in a ring to form the first communication area.

6. The method according to claim 5, wherein the storage system is a Redundant Array of Independent Disks, and the method further comprises:

in response to one storage device among the plurality of storage devices failing, recovering data in the message queue from other storage devices among the plurality of storage devices.

7. A method for receiving a message in a storage system comprising a first controller, a second controller, a first communication area and a second communication area, the method comprising:

reading the message from the first communication area that is readable and writable to the first controller and readable to the second controller, wherein reading the message from the first communication area comprises:

determining a state of the first communication area according to metadata in the first communication area, wherein the metadata defines the address for storing the message in the first communication area such that when a position, a size, and an internal organization of the first communication area are customized, determining the state of the first communication area includes determining that there still exists an available storage space in the first communication area for writing a new message;

writing the message to the first communication area in response to the state indicating that the first communication area is not full; and not writing the message the first communication area in response to the state indicating that the first communication area is full;

reading an address identifier from the second communication area, the second communication area being readable to the first controller and readable and writable to the second controller;

in response to receiving another message that is to be delivered from the second controller to the first controller, writing the other message to the second communication area by the second controller; and writing another address identifier to the first communication area, the other address identifier being used for indicating an address at which the first controller reads the other message from the second communication area, the first communication area being readable and writable to the first controller and readable to the second controller.

8. The method according to claim 7, wherein the first communication area comprises a message queue, the storage system comprises at least one storage device, the first communication area crosses respective storage areas in the at least one storage device, the respective storage areas being connected in a ring to form the first communication area.

9. A system for delivering a message in a storage system, comprising:

one or more processors;

a memory coupled to at least one processor of the one or more processors;

computer program instructions stored in the memory which, when executed by the at least one processor, cause the system to execute a method for delivering a message in the storage system, the storage system comprising a first controller, a second controller, a first communication area and a second communication area and the method comprising:

in response to receiving a message that is to be delivered from the first controller to the second controller, writing the message to the first communication area that is readable and writable to the first controller and readable to the second controller, wherein writing the message to the first communication area comprises:

determining a state of the first communication area according to metadata in the first communication area, wherein the metadata defines the address for storing the message in the first communication area such that when a position, a size, and an internal organization of the first communication area are customized, determining the state of the first communication area includes determining that there still exists an available storage space in the first communication area for writing a new message;

writing the message to the first communication area in response to the state indicating that the first communication area is not full; and not writing the message the first communication area in response to the state indicating that the first communication area is full;

writing an address identifier to the second communication area, the address identifier being used for indicating an address at which the second controller reads the message from the first communication area, the second communication area being readable to the first controller and readable and writable to the second controller and indicating an address;

in response to receiving another message that is to be delivered from the second controller to the first controller, writing the other message to the second communication area by the second controller, the second communication area being readable to the first controller and readable and writable to the second controller; and writing another address identifier to the first communication area, the other address identifier being used for indicating that the first controller reads an address of the other message from the second communication area.

10. The system according to claim 9, wherein the writing the message to the first communication area further comprises:

determining an available address for writing the message to the first communication area based on the metadata in the first communication area; and writing the message to the available address.

11. The system according to claim 10, wherein the first communication area comprises a message queue, the metadata in the first communication area comprising a head pointer of the message queue; and the method further comprises:

in response to the message being written to the available address, updating the head pointer to indicate another available address for writing a message to the first communication area.

12. The system according to claim 11, wherein the address identifier comprises a tail pointer of the message queue, and the method further comprises:

in response to the second controller reading the message from the tail pointer, updating the tail pointer by the second controller so as to point to another message.

13. The system according to claim 11, wherein the storage system comprises a plurality of storage device, and the first communication area crosses respective storage areas in the plurality of storage devices, the respective storage areas in the plurality of storage devices being connected in a ring to form the first communication area.

14. The system according to claim 13, wherein the storage system is a Redundant Array of Independent Disks, and the method further comprises:

in response to one storage device among the plurality of storage devices failing, recovering data in the message queue from other storage devices among the plurality of storage devices.

15. The method according to claim 1, further comprising:

in response to receiving a message that is to be delivered from the second controller to the first controller, writing the message to the second communication area that is readable and writable to the second controller and readable to the first controller; and writing an address identifier to the first communication area, the address identifier being used for indicating an address at which the first controller reads the message from the second communication area, wherein the first communication area is readable to the second controller and readable and writable to the first controller.

16. The system of claim 9, wherein the method for delivering a message in the storage system further comprises:

in response to receiving a message that is to be delivered from the second controller to the first controller, writing the message to the second communication area that is readable and writable to the second controller and readable to the first controller; and writing an address identifier to the first communication area, the address identifier being used for indicating an address at which the first controller reads the message from the second communication area, wherein the first communication area is readable to the second controller and readable and writable to the first controller.

17. The method according to claim 1, wherein determining the state of the first communication area according to the metadata in the first communication area includes setting a flag in the metadata, the flag being indicative of whether one or more messages are stored in the storage space and whether the first communication area is full or not full.

18. The method according to claim 7, wherein determining the state of the first communication area according to the metadata in the first communication area includes setting a flag in the metadata, the flag being indicative of whether one or more messages are stored in the storage space and whether the first communication area is full or not full.

19. The method according to claim 9, wherein determining the state of the first communication area according to the metadata in the first communication area includes setting a flag in the metadata, the flag being indicative of whether one or more messages are stored in the storage space and whether the first communication area is full or not full.

* * * * *